April 13, 1926.

J. F. PALMER 1,580,625

METHOD OF MANUFACTURING TIRES

Filed Jan. 31, 1920    2 Sheets-Sheet 1

Inventor:
John F. Palmer

April 13, 1926.
J. F. PALMER
1,580,625
METHOD OF MANUFACTURING TIRES
Filed Jan. 31, 1920     2 Sheets-Sheet 2
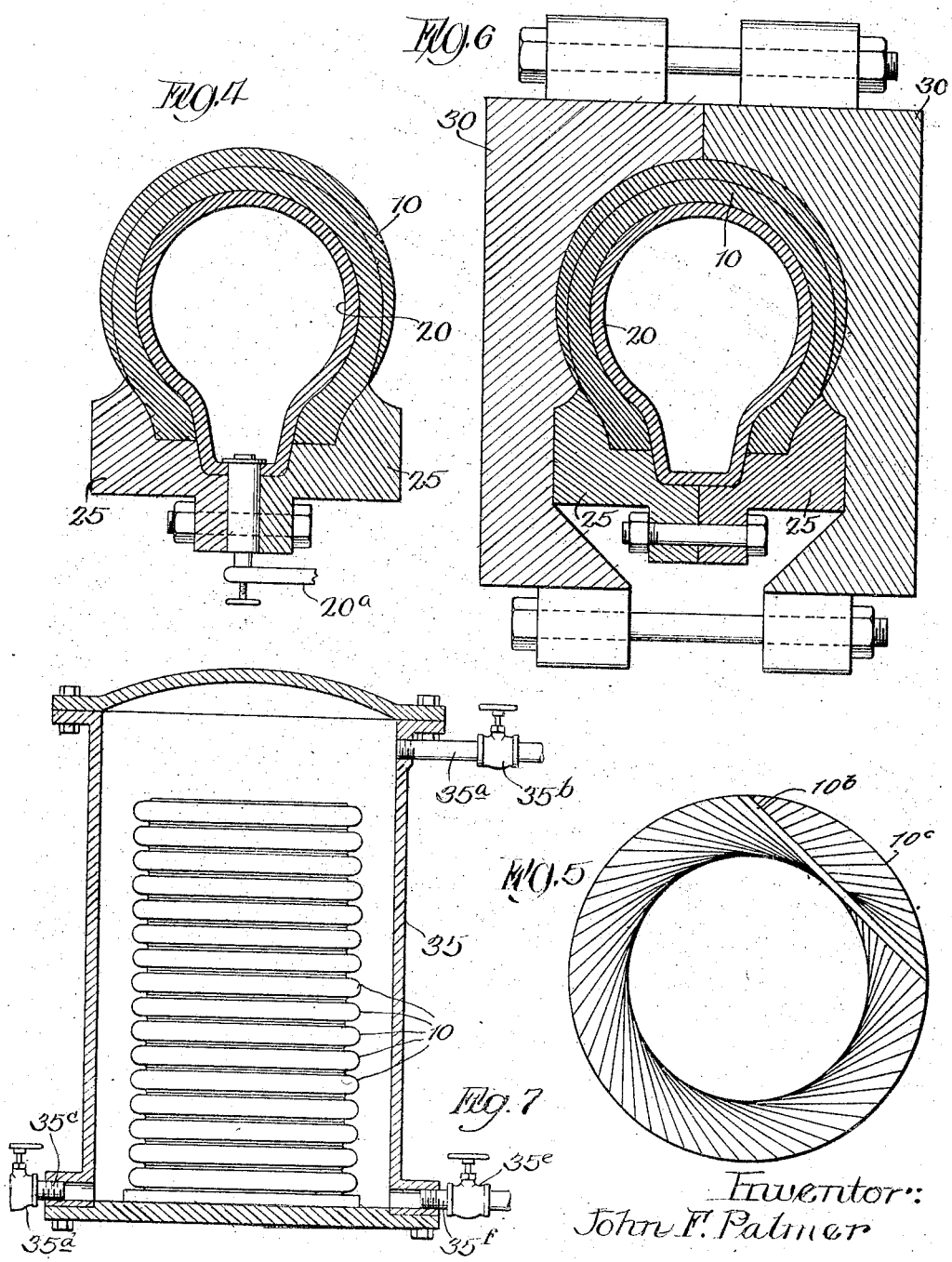

Patented Apr. 13, 1926.

1,580,625

UNITED STATES PATENT OFFICE.

JOHN F. PALMER, OF ST. JOSEPH, MICHIGAN.

METHOD OF MANUFACTURING TIRES.

Application filed January 31, 1920. Serial No. 355,395.

*To all whom it may concern:*

Be it known that I, JOHN F. PALMER, a citizen of the United States, residing at St. Joseph, in the county of Berrien and State of Michigan, have invented certain new and useful Improvements in Methods of Manufacturing Tires, of which the following is a specification.

This invention relates to pneumatic tires, and, while valuable in the manufacture of all types, it is particularly useful in the manufacture of the type of casing illustrated and described in Patent No. 924,572, granted to me June 8, 1909. I have characterized this type of tire casing as "tangent laid," for the reason that the cords or primary strain-resisting members thereof are laid tangent to the periphery of the rim, and the edges or beads of the tire are the aggregate of the cords spanning the tread, and need no wires or other rigid aid to secure attachment to the rim.

Referring particularly to the above type of tire casings, considerable difficulty has been encountered in initially shaping the edges to conform to rim requirements; in taking a predetermined amount of stretch out of the edges of the carcass, so that the tire may not expand in service and its security of attachment to the wheel rim when in operative condition be thereby endangered; in equalizing unequal tension in the body cords; and, finally, in holding unchanged the position and condition of the strain-resisting members during that period of the cure when the rubber, becoming soft through heat, will flow and tend to disturb or displace the cords if at the time the tire is subjected to rigid pressure; all of which will be understood and appreciated by those skilled in the art.

It is well known in the art to which this invention belongs that raw cold rubber will move under pressure when in the condition used in factory practice, that is "broken down," "masticated," and "mixed," or in the presence of softening agents mixed with rubber, such as oil and various other compounding components used in the art; and it should be understood that deformation of raw rubber may be had under these conditions under pressure as certainly, if more slowly, as when heated. Hence heat introduced in the process of deformation only serves to economize time and thus lower cost. This softening of the rubber may be just as effectively had by utilizing the heat of the set cure period, if such temperature be low enough to prolong this period sufficiently for the more or less sluggish yielding of the rubber to the forces acting on it to desired completeness before setting. Where this method is used, it is customary to start the cure at a comparatively low temperature, and during the latter portion of the cure raise the temperature as a measure of time economy.

It is also well known that, when using cotton as the fibrous strain-resisting material in tire manufacture, better results may be had in the finished product if a proportion of the stretch that is inherent in such twisted fibrous materials be taken out, to the end that its effective resistance to strain be rendered more quickly available in service; and that it may displace less rubber, and thus result in a more permanent and intimate contact between the two primary components of the tire carcass. Cotton cord will stretch under tension until it breaks. I shall term that remaining in the cords or fibrous material of the finished tire, or after any stretching operation, as "residual stretch."

It is common practice in the manufacture of tires, especially cord tires, to expand the tire in the process of final vulcanization a predetermined percentage, usually by an air bag, the latter constituting a smooth surfaced, flexible, expansible, and symmetrical agent for the purpose, the use of which tends to expand the tire symmetrically as a whole, although not rigidly so. A fluid under pressure, when used as the expanding agent would in all cases invariably act to distend the tire in the line of least resistance, thus revealing in the vulcanized product inequalities in mass, tension, or placement of the strain-resisting medium employed. Having this in mind, it will be understood that when the term "fluid pressure" is used, I mean a non-deforming fluid pressure, that is, one that will not disturb the placement or relations of the tire components, either rubber or fabric.

Tires are built on a smooth, hard, symmetrical form, usually of iron. Air bags are cured within a smooth, hard, symmetrical mold, usually iron, and are designed to replace this building form during vulcanization. Hence, it is possible to use an air bag as resistance against fluid pressure as an expanding agent; or, if no expansion is required, the iron core itself may be used, if the external pressure be fluid in character. Under these circumstances there will be little or no flow, but there will be a compacting action that will accentuate or reveal, but not remove, mass inequalities.

It is common practice in the art to assemble the tire completely and then vulcanize at one temperature and time period, or increase the temperature in steps to a final cure; to build the carcass and tread portions separately—semi-cure the carcass and tread separately, join them with vulcanizable cement, and final cure the whole. Any of these methods may be used in practicing my improved method of tire manufacture, in which the steps set forth here, together or separately, may be useful, without departing from the spirit of the invention; and it will be understood that I do not desire to confine myself to any set temperature in the application of my invention either in the semi-cure or final-cure periods, both being dependent on the nature of the compound and the proportion of vulcanizing agents.

I also desire it to be understood that the term "cords" used herein is intended to mean any association of yarn, threads, cord, or fibrous material, where the strain-resisting members lying at an angle to each other are in separate layers, whether associated with widely separated interwoven filler yarns or not, regarding which those skilled in the art are fully informed. In the manufacture of tires by my preferred method the cords of the casing may be laid as set forth fully in U. S. Patent 924,572, hereinbefore referred to, with further steps as given below.

I find it advantageous that a predetermined percentage of stretch be taken out of the bead or inner edges of the casing, so that it may more readily, accurately, and firmly conform to the desired shape and, possessing less residual stretch, more surely remain properly seated on a wheel rim. I therefore, build the tire with the "bead" line—the extreme inner edges of the casing—carried a predetermined distance below normal, say, one-half inch. Then, either before or after the tire is removed from the form—before if the tire is to be cured on the form, after if to be cured off it—I stretch the edges of the casing circumferentially to the desired extent, preferably by mechanical means. I then drop in the well-known bead-forming rings, which form no part of this invention and, while the inner edges of the casing are fixedly held by said rings, by means of an air bag or other agent, expand the tire a limited amount to put the cords under strain. I then heat and semi-cure the tire under fluid pressure, as of steam, in direct contact with one or both surfaces of the tire, or exerting its pressure through any other fluid medium, either on a rigid core, an air bag, or free from rigid confinement on all sides, except the inner edges, to which are fixedly held, as above-suggested, the bead-forming rings.

Semi-curing the tire under limited strain is done because of the practical impossibility of laying the several layers of cord, with intervening rubber, at equal tension, as between the layers themselves and also the individual cords of the layers; and, while it is of vital importance that the placement and predetermined relation of the cords be not disturbed in the process of vulcanization, it is most important that the tension be equalized so as to bring the cords to a balanced condition. I have, therefore, introduced the limited distention of the body of the tire during the early or set cure period of vulcanization, so that the cords may be strained longitudinally while the rubber softens and loosens its hold on the cords, and, the ends of the cords being free, may under the drag of the tension introduced slip along stream lines as originally laid to a condition of common tension equal to the resistance to this movement of the softened rubber.

In order that the foregoing may be accomplished without disturbing the placement and relation of the cords and rubber as originally laid, I have obtained success, though I do not confine myself to the method, by mounting the raw tire or carcass on bead-forming rings with an air bag, heating the whole to the softening point of rubber, say, 212° Fahr., and, while the inner edges of the tire are fixedly held, expanding the tire or carcass by internal pressure, such as air or fluid forced into the air bag, rubber air tube, or tube cavity of the tire to a predetermined degree and thereupon subjecting the tire to open steam in a vulcanizer at a pressure designed to semi or set-cure the tire, as described, say, thirty-five pounds for fifteen or more minutes, the steam pressure exerted on the exterior of the tire being balanced by the air bag, or other resistance, to prevent deformation. I do not desire to limit myself to this exact method of assembly, or to the use of an air bag, as I consider it within the purview of my invention to use any convenient medium for expanding the tire and holding it as expanded during the set-cure period.

I have found it useful to cool the tire under pressure after semi-cure, so that the gas-making materials included within its structure in manufacture may be held to original area by superior external pressure, to avoid undesirable expansion with consequent porosity or blisters in the body of the tire when the steam pressure is removed.

In one method of carrying out this step I, therefore, while the tire is still in the vulcanizer and in the presence of steam maintained at any desired pressure, force water into the vulcanizer until the tires or other articles are submerged in the water and cooled, whereupon both water and steam are permitted to escape.

There is hardly any stage in the vulcanization of rubber where, under the influence of heat and pressure, the article may not be further vulcanized and a new and permanent contour given to it. Hence, if the product of the last step still possesses unused vulcanizing agents, further heating to a sufficient temperature and heavy pressure in molds will result in a further cure and smoothing or roughening of the surface of the tire to conform to the enclosing mold, without material disturbance to the carcass members, and an article of good commercial appearance will be had with superior wearing properties as well as at a lowered cost of production. Therefore, the semi-cured tire may be enclosed in a suitable mold with an expansible air bag and bead-forming rings, the cavity of which is, preferably, a pre-determined percentage larger in cubic measurement than the semi-cured tire, so that the body of the tire, under pressure introduced into the air bag, may be stretched to fill the mold and fixed in that condition by heat and pressure in this, the final cure.

In the accompanying drawings I have illustrated apparatus capable of carrying out my process.

Fig. 4 is a transverse section through a raw tire showing the attached bead-forming rings and inserted air bag;

Fig. 5 is a vertical section through a vulcanizer, showing the steam and water supply and also a plurality of tire casings upon bead-forming rings therein; and Fig. 6 is a vertical section through a mold, showing the casing and bead-forming rings therein after final curing. In Fig. 7, I have illustrated, more or less diagrammatically, the method of forming the carcass of a "tangent laid" tire.

Like numerals refer to like elements throughout the drawings, in which 10 indicates generally a raw tire or casing, the dotted lines indicating the inner periphery of the beads for stretching.

In Fig. 7 I have illustrated diagrammatically a partially constructed carcass formed as disclosed in my earlier Patents 924,571 and 924,572; for example, the carcass being generally indicated by numeral 10$^a$ and being formed of strips or ribbons 10$^b$, each ribbon comprising a plurality of parallel cords sheathed or embedded in frictioning rubber. These strips 10$^b$ are laid upon a form or core in such wise as to be tangential to the inner or bead edges of the carcass extending from tread point in obvious manner, succeeding plies of ribbon being slightly inclined with respect to those previously laid. Due to the lesser diameter of the carcass at the bead portions there is a considerable excess of thickness or material at such point which enables me to form my bead without the addition of filler material.

Figure 1:
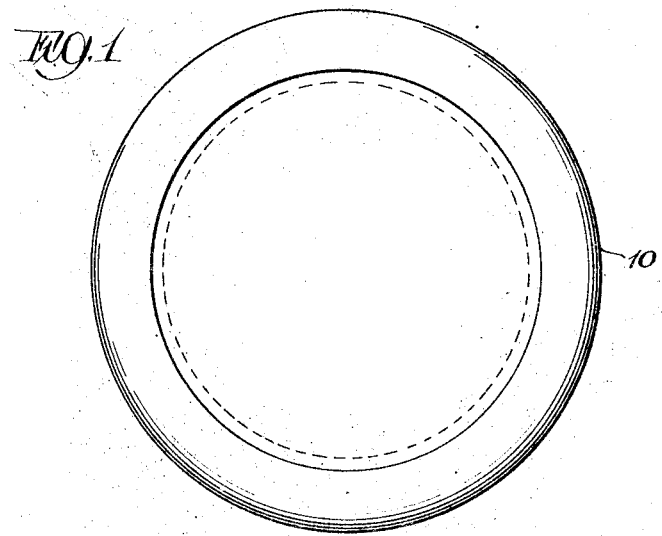
Figure 1 is a front elevation of the raw tire or carcass, the dotted lines indicating the original inner periphery or bead-line.
Figure 2:
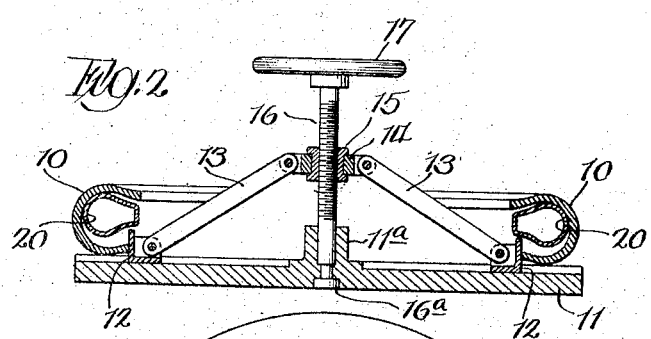
Fig. 2 is a vertical section of an apparatus for stretching or expanding the beads.

In Fig. 2 I have illustrated a device for stretching the beads on the tire one at a time, although it is obvious that other devices may be utilized for stretching one or both beads simultaneously.

Figure 3:
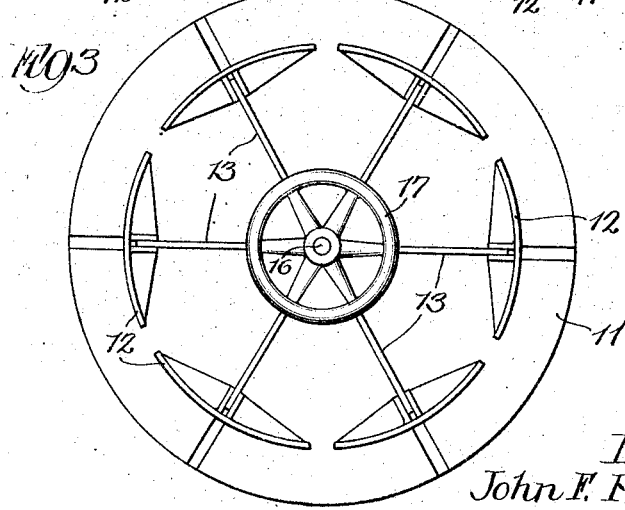
Fig. 3 is a plan view of the same.

In the device shown in Figs. 2 and 3 a base 11 is provided, upon which are reciprocally mounted expanding segments 12, each provided with a toggle 13 leading to a ring 14, in which is non-rotatably mounted the collar 15 threaded upon the screw shaft 16, provided with a mutually operable handle 17 at one end, which is rotatably mounted in the central hub or boss 11$^a$ of the table 11, a detached cap 16$^a$ being provided to coact with the base plate 11 to permit rotation, but not reciprocation, of the shaft 16 with respect to the base 11.

In Fig. 2 I have also illustrated a casing or tire having an air bag 20 therein, the same being preferably only slightly inflated, so as not to interfere with the bead-stretching operation. The expanding segments 12 contact with one of the beads and, as will be obvious, actuation of the handle 17 will serve to expand said bead the desired amount, as in the example stated above, an amount sufficient to increase the diameter of the periphery of the bead one inch. After stretching one bead the tire may be removed from the base 11, a bead-forming ring applied to the stretched bead and the tire inverted for stretching of the other bead, after which the other ring is applied and bolted to the first ring as shown in Fig. 4. The air bag 20 is then expanded to the desired pressure, as, for example, thirty-five pounds, by admission of air through the supply tube 20$^a$, and the casings on the rings are placed in the vulcanizer 35 and live steam admitted thereto under desired pressure, as thirty-five pounds, for example, for such period of time as is desirable, say, ten or fifteen minutes. It may be advisable in some instances to apply a coating of muslin, or other substance permeable to steam, to the exterior of the casing to prevent flow of the rubber when heated.

After semi or set curing has been conducted for the desired length of time in the vulcanizer a valve 35$^d$ is opened and cooling water under pressure is admitted at any desired rate, the pressure of the water being sufficient to overcome the pressure of the steam and expel the same into the steam line, after which the valve 35$^b$ may be closed to cut off the steam. When the tires are cooled the valve 35$^d$ has closed and the valve 35$^e$ is opened to drain the water from the cylinder 35.

A final cure or vulcanization may be effected with or without stretching of the casing, by placing the casing and bead-forming rings, together with the air bag, in a mold 30, formed in sections which may be drawn or forced together to react to the pressure within the casing; or I may desire to employ a mold which is larger than the casing in its set-cured condition and the bag may be inflated a sufficient amount to expand the casing and tread against the wall of the mold, the molds being placed in the vulcanizing cylinders 35 and heated by the steam as in the set cure, generally to a higher temperature. This final cure also results in a further substantial reduction of the residual stretch of the cords where the oversize mold is used, this being highly desirable. After the vulcanization has been accomplished, the steam may again be replaced by the cooling water, and the molds removed after cooling.

It will be apparent that I may utilize this apparatus in such wise as to dispense with the semi or direct curing by direct contact with the steam and may utilize molds and confined air bags for the set curing process, utilizing the steam and water for heating and cooling.

It will also be obvious that the apparatus described may be modified or altered without varying the practice of my process.

I claim:—

1. The method of forming an annular pneumatic tire casing which consists in forming the carcass thereof of strips laid tangent to the free edges and thereafter mechanically expanding such free edges to reduce the residual stretch therein a predetermined degree.

2. The method of forming a pneumatic tire casing which consists in forming a carcass with bead portions stretchable radially of the carcass and thereafter subjecting such bead portions to a radial expansion to reduce the residual stretch thereof a predetermined degree.

3. The method of forming a pneumatic tire casing which consists in forming the carcass of strips laid tangent to the free edges thereof, said strips overlapping at such free edges to form bead portions and thereafter subjecting such bead portions to a radial expansion to reduce the residual stretch thereof a predetermined degree.

4. The method of forming an annular U-shaped pneumatic tire casing formed of cords and the like associated with rubber, which consists in mechanically expanding the inner edges thereof so as to reduce the residual stretch therein to a desired degree, then subjecting the body of the carcass to heat and expansion while the edges thereof are fixedly held so that the difference in tension between individual cord members or the like of the carcass is equalized, set-curing and water-cooling said carcass under maintained pressure, then subjecting said body portion of the tire to further expansion in the presence of heat so as to reduce the residual stretch of said body members to a predetermined degree, and finally cooling the tire while in its final distended position and under fluid pressure.

5. The method of forming an annular U-shaped pneumatic tire casing formed of thread, cord, and the like associated with rubber, which consists in first assembling the fibrous parts, such as said threads, cords, fabric, and the like, with rubber upon a ring core, then expanding the edges or so-called bead portion circumferentially and securing them in such position, then subjecting the body of the tire while said edges are fixedly held to expansion in the presence of heat to equalize the tension of the fibrous members thereof, semi-curing under a non-deforming pressure, then cooling by water under maintained pressure, then vulcanizing under a rigid mold pressure, and finally cooling the tire.

6. The method of forming an annular U-shaped pneumatic tire casing formed of thread, cord, and the like associated with rubber, which consists in first assembling the fibrous parts, such as threads, cords, fabric, or the like, with rubber upon a ring core, then expanding the edges or so-called bead portion circumferentially and securing them in such position, then subjecting the fibrous members of the body of the tire while said edges are fixedly held to expansion in the presence of heat to equalize the tension of the fibrous members thereof, semi-curing under a non-deforming pressure, cooling by water under maintained pressure, then final curing the carcass under a rigid mold pressure, and lastly cooling the tire by submerging the same with its mold in water while under pressure.

In testimony whereof, I have subscribed my name.

JOHN F. PALMER.